March 18, 1924.
A. C. BUNTEN
ADJUSTABLE BUSHING
Filed Feb. 23, 1922
1,487,534
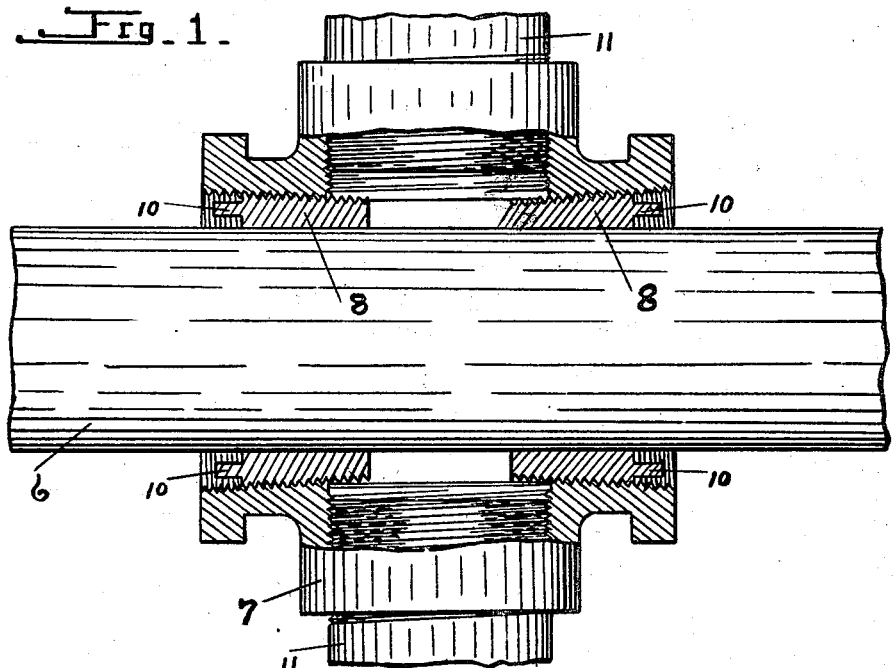
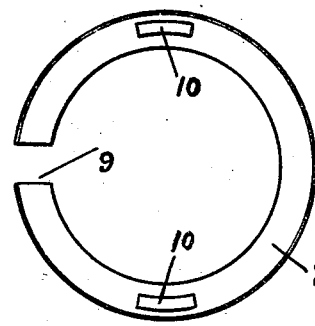
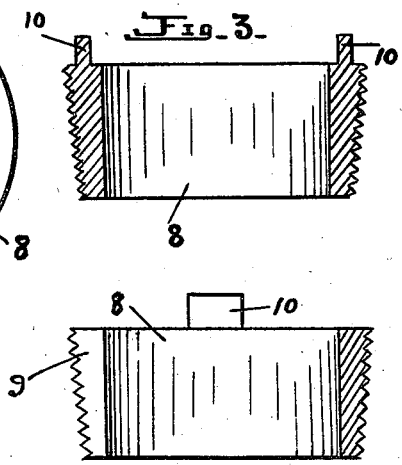
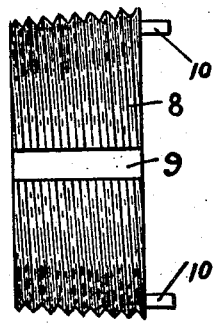
Inventor
Alpheus C. Bunten,
By Hiram A. Sturges,
Attorney Patented Mar. 18, 1924.

1,487,534

UNITED STATES PATENT OFFICE.

ALPHEUS C. BUNTEN, OF COUNCIL BLUFFS, IOWA, ASSIGNOR OF ONE-HALF TO MARGARET BEALL HARDING, OF OMAHA, NEBRASKA.

ADJUSTABLE BUSHING.

Application filed February 23, 1922. Serial No. 538,509.

*To all whom it may concern:*

Be it known that I, ALPHEUS C. BUNTEN, a citizen of the United States, residing at Council Bluffs, in the county of Pottawattamie and State of Iowa, have invented certain new and useful Improvements in Adjustable Bushings, of which the following is a specification.

This invention has for its object, broadly, to provide a bushing which will be convenient and effective in use for securing pipe-couplings to a pipe. The invention includes a split sleeve of tapered form, provided with lugs and adapted to be threaded in the pipe-coupling for the foregoing purposes, the lugs being of such form and arrangement that they may be disposed inwardly of the ends of the coupling when the latter has been secured to the pipe.

The invention consists of the novel construction, combination and arrangement of parts as described herein and claimed, and as illustrated in the accompanying drawing, wherein,—

Fig. 1 is a view, partly broken away and in section, showing a pair of the bushings applied to a pipe-coupling and pipe. Figs. 2, 3, 4 and 5 show the adjustable bushing in its normal, expanded condition. Fig. 2 is an end view of the bushing. Fig. 3 is a sectional view of the same taken through a pair of opposed lugs. Fig. 4 is a side view of the bushing. Fig. 5 is a sectional view through the bushing, taken at right-angles to the view shown in Fig. 3.

Referring now to the drawing for a more particular description, numeral 6 indicates a pipe, and in order that a pipe-coupling 7 may be secured thereto I provide a pair of exteriorly threaded, tapered sleeves 8, each being provided with a slot, opening on its ends, as indicated at 9, and provided at its end of greater thickness with lugs 10, preferably having a lesser thickness than the wall of the sleeve.

The bushing may be made of various diameters, depending upon the size of the pipe and the size of the coupling, but in all instances the bushings will be of such proportion that their diameters will be reduced when threaded in the couplings, the slot 9 permitting contraction or reduction of diameters.

The pipe 6 may have any suitable length and any suitable number of couplings may be mounted thereon, the operation being that the bushings 8, which in longitudinal section are wedge-shape, may be rotated by means of a wrench or other implement adapted to engage the lugs 10, the threads of the bushing engaging the interior threads of the coupling 7, when thus rotated, and causing the bushing to be contracted throughout its entire length and to be pressed against the surface of the pipe 6 with such force that it will be effectively secured thereto.

By use of the invention a great saving in labor in effected, especially in the building of tubular fire-escapes, guard-railing or other similar structures, since it will not be necessary to cut the pipe into sections, and the work of forming threads on the ends of the sections may be eliminated.

It will be noted that when the pipe-coupling has been secured to the pipe 6, the bushings will not be exposed or obtrusive, but will be housed within the coupling since the lugs 10 have a lesser thickness than the wall of the bushing, and may be disposed inwardly of the end of the coupling.

Numerals 11 indicate pipes which are mounted in and are disposed in angular relation to the pipe 6. While these are shown to be threaded in the pipe coupling, it is obvious that they could be secured to the coupling by means of the herein described bushings.

While I have shown and described details of construction, I do not wish to be understood as limiting myself to exactness in this respect, and changes in form, size, proportion and minor details may be made, as found to be of advantage, said changes to be determined by the scope of the invention, as claimed.

I claim as my invention,—

1. In an adjustable bushing for a pipe coupling and pipe, a tapered sleeve having a slot formed longitudinally therein to open on its ends and having lugs projecting beyond its end of greater thickness having a lesser thickness than the wall of the sleeve, said sleeve having a threaded connection with the pipe coupling and being revoluble on the pipe for a movement inwardly of the pipe coupling.

2. In an adjustable bushing for securing a pipe coupling to a pipe, said coupling being interiorly screw-threaded, a sleeve having a slot formed longitudinally therein to open on its ends and having a screw-threaded exterior formed uniformly convergent between its ends and having lugs disposed inwardly of the plane and projecting beyond its end of greater thickness, said sleeve being adapted to be disposed on the pipe with its screw-threads engaging the screw-threads of the pipe-coupling and to be rotated for reducing its diameter throughout its entire length and to dispose its lugs in the plane of the pipe-coupling in this engaged relation with said coupling and pipe.

In testimony whereof, I have affixed my signature in presence of two witnesses.

ALPHEUS C. BUNTEN.

Witnesses:
　HIRAM A. STURGES,
　ARTHUR H. STURGES.